Dec. 17, 1968  C. O. MERCHANT  3,417,220
AUTOMATIC WELDING MACHINE
Filed Jan. 28, 1966  5 Sheets-Sheet 1

INVENTOR,
CHESTER O. MERCHANT
BY Watson, Cole, Grindle & Watson
ATTORNEYS

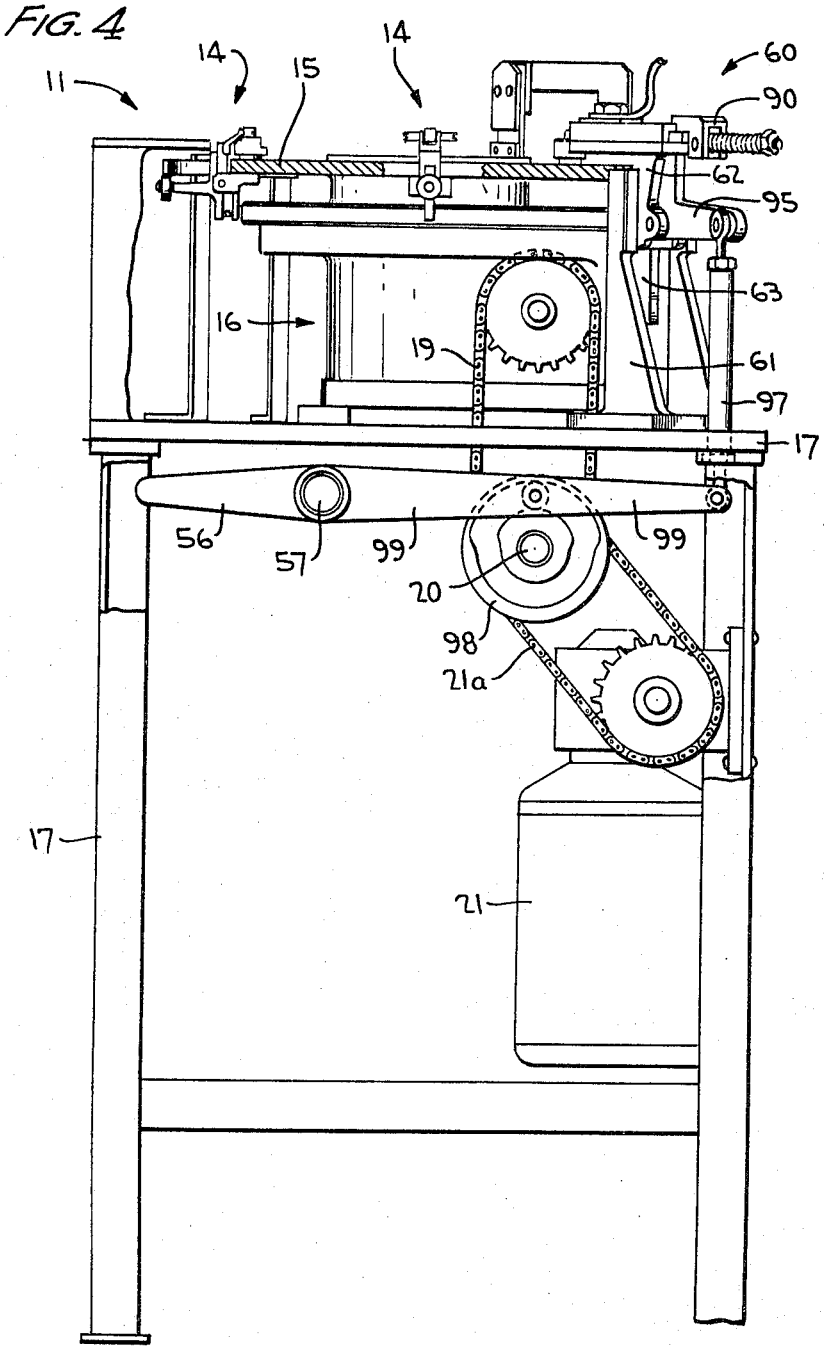

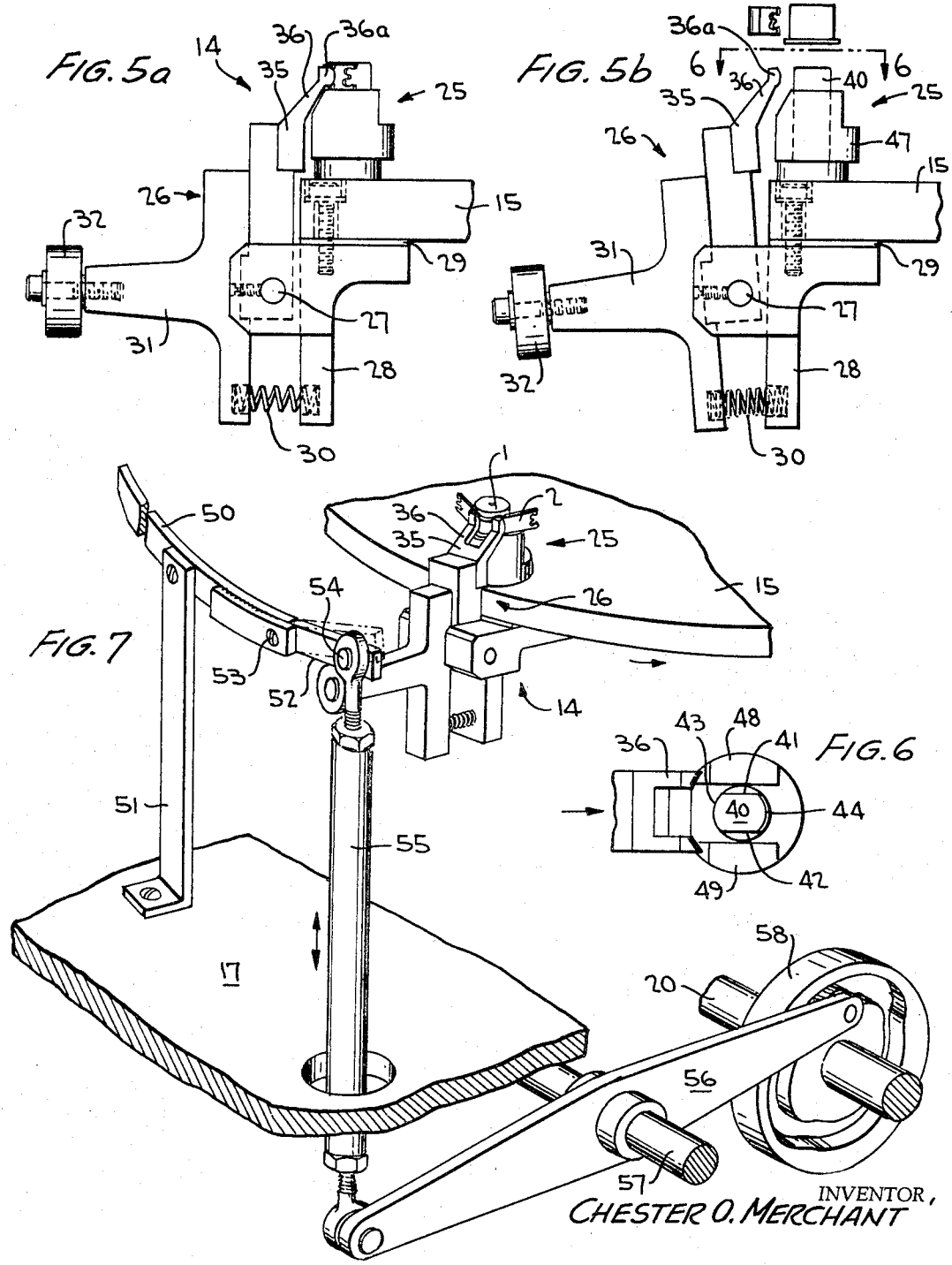

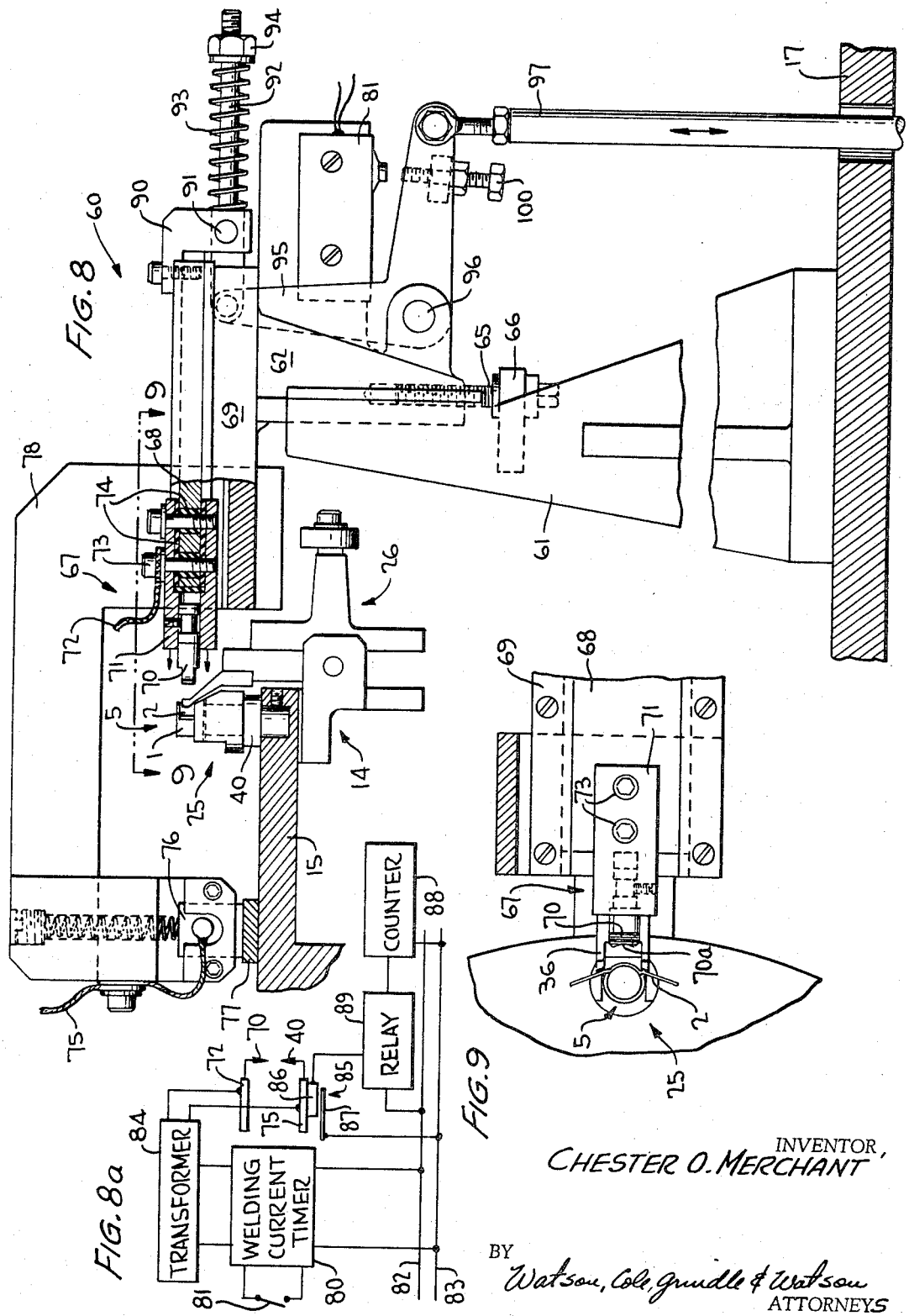

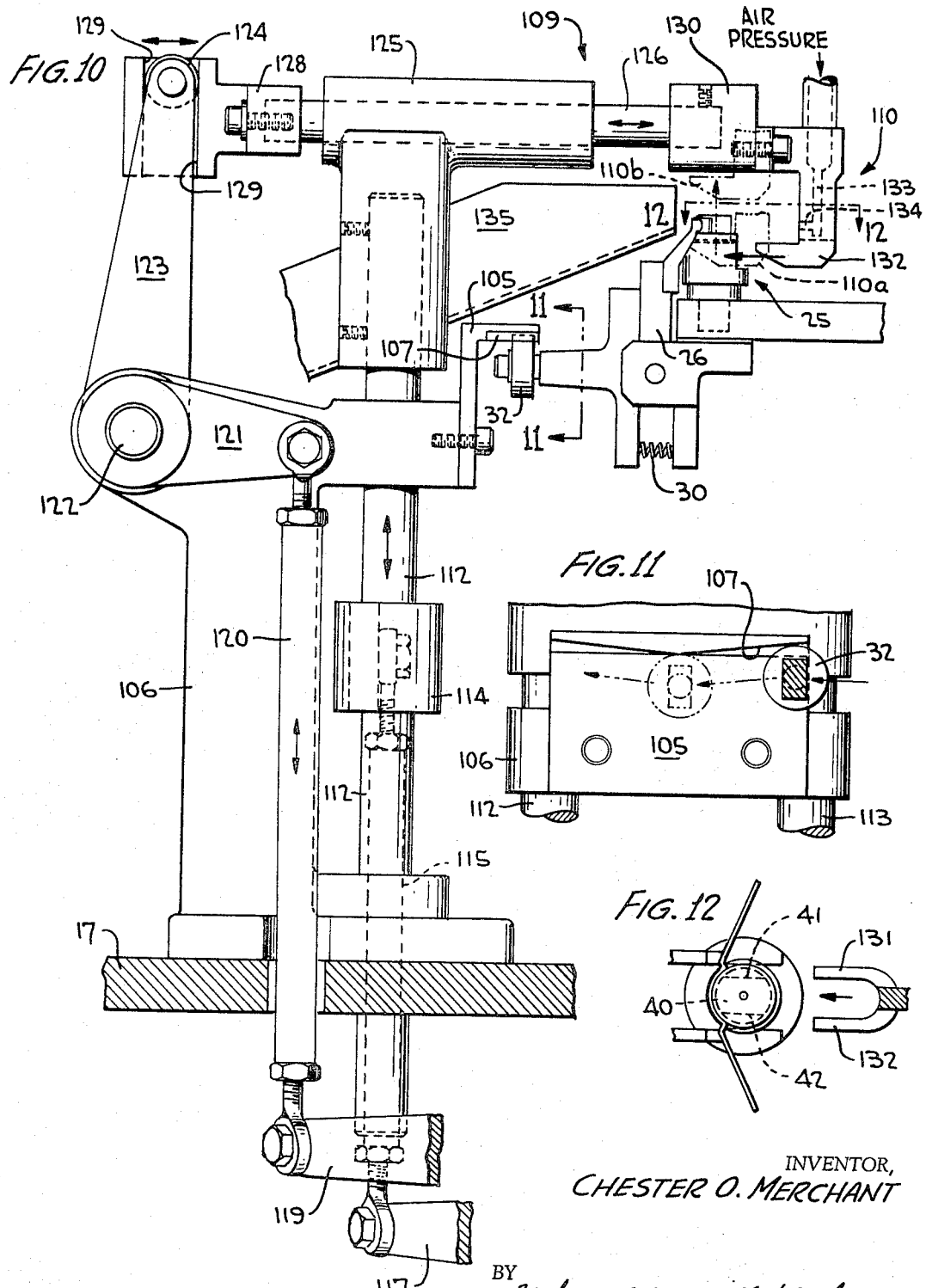

United States Patent Office 3,417,220
Patented Dec. 17, 1968

3,417,220
AUTOMATIC WELDING MACHINE
Chester O. Merchant, Owensboro, Ky., assignor, by mesne assignments, to Kentucky Electronics Inc., Owensboro, Ky., a corporation of Delaware
Filed Jan. 28, 1966, Ser. No. 523,714
12 Claims. (Cl. 219—80)

ABSTRACT OF THE DISCLOSURE

Automatic means and methods are disclosed for welding together in precise locations two parts to an electron gun. An indexing turret table has stations for receiving one part, receiving the other part, clamping the second part in place for rotation with the turret table, welding the parts together and discharging the welded piece. A special spring and plunger assembly works with a welding head to adjust pressure, and a fork assembly unloads the welded pieces at an unloading station so that they may be blown away from the support.

---

The present invention relates to specialty welding apparatus and processes and, more particularly, to an apparatus and process for automatically welding electron tube components, such as electrode components for electron guns in cathode ray tubes.

In the manufacture of electron guns for color television tubes, it has been proposed to mount a plurality of prefabricated metal electrode bodies each having a metal supporting strap or member in thermoplastic beads to position the electrode bodies both in the longitudinal and the transverse directions so as to form three separate converging electron paths in the completed gun, as set forth in my patent application entitled Electrode Component and Method of Making Same, Ser. No. 523,715, filed Jan. 28, 1966. It has been found that these preformed, contoured straps are best welded to the tubular electrode body in a substantially large area around the curvature of the body and that the welding must produce a high quality joint to insure that the critical convergence of the electron paths in the color gun is maintained in such a manner as not to be susceptible of being misaligned during subsequent manufacturing operations or during use. Since there are approximately 15 of these electrode components that go to make up a color gun, it would be advantageous if these welded electrode components and similar electron tube components could be mass-produced in an automatic fashion without sacrificing the quality of the weld on the product. According to the present invention, a welding machine and process is provided that utilizes a turntable support, a welder assembly and an unloader assembly that accomplishes this purpose in a novel manner.

In the prior art, in so far as I am aware, the welding of the old type radially extending studs to the electrode bodies has been carried out by automatic machinery but in this machinery there is no means other than the welding electrode itself for positioning the stud against said electrode body. Further, in this prior art, the positioning of the stud with relation to said body has heretofore generally been performed in a generally inexact manner at the same station or position as the welding operation. While these prior arrangements have generally been satisfactory for their intended purpose, they have proven to be unadaptable for the most part to produce the more rigid and higher quality welded electron gun component required for color guns wherein the contoured strap extends around the curvature of the electrode body.

The shortcomings of the prior art in this specialized manufacturing field extend mainly to the lack of accuracy in precisely positioning the studs on the body prior to the welding operation, which tends to reduce the quality of the weld obtained in these components, so much so, in fact, that prior to this invention, the production of high quality color gun components has been largely dependent upon hand-welding operations which are, of course, more costly and time consuming. Thus, with such prior art machinery, there has been found to be a tendency for the stud when carried and positioned by the welding electrode to sometimes touch and thus be welded to the tubular body in a slightly skewed or nonuniform manner outside the intended weld area. This, in turn, results in an uneven and weak weld across said area that is likely to fail during assembly or later during the service life of the tube. In certain extreme cases, a distortion or shrinkage of the surface of the component can result under the described conditions, which, of course, destroys the electron beam-shaping ability of that component and, accordingly, this destroys the usefulness of the gun of which said component is a part.

Further, some of these arrangements of the prior art form and position the stud at the same time by passing the stud through an extruding die as the welding head is driven by a high-impact driver into position to perform the welding operation. This condition tends to create an inaccurate and uneven welding motion that adversely affects the accuracy and quality of the weld obtained. In addition, the operating linkage for the welding head is subject to excessive wear and distortion in these cases due to the repeated high impact force placed on said welding head, which after extended use of the machine not only causes the welding head to present inaccurately formed studs and/or slightly off-center welding, but in extreme cases even causes failure of the operating parts of the machine with resultant costly shutdown of production equipment.

Accordingly, it is one object of the present invention to provide a welding apparatus and process for accurately positioning and clamping a separate preformed strap or support member with respect to an electrode body and welding the same together to form an electron gun component.

Another object of the present invention is to provide an apparatus and process for mass-producing electron tube components such as electrodes for a color electron gun wherein the parts of said component are clamped to a support at a loading station, the parts are welded at a welding station, and the welded component is unloaded at an unloading station.

It is another object of the present invention to provide an apparatus and process of the character described for fabricating metal electron tube components without damaging or marring the body or the surface of the components in the proximity of the electrons.

The preferred embodiment of a machine constructed in accordance with the present invention is shown in the accompanying drawings for the purpose of illustrating the invention, which machine is particularly adapted to weld electron gun components, although it is to be understood that other similar or equivalent electron tube components can be welded without departing from the teachings of the invention. It should also be noted that in the preferred embodiment disclosed, the parts to be welded are, of necessity, fabricated from nickel, nickel alloy or other similar metals that are capable of controlling or emitting electrons in the desired manner, and that the preferred type of welding operation is electrical resistance heating of the weld area by current-carrying welding electrodes. With regard to the structure of the machine of the invention, it may takes the form of a combination of elements or their equivalents including an indexing turntable, a plurality of fixed operating stations situated around said turntable, a plurality of upstanding supports mounted on said turntable for supporting the components to be welded in a manner so as to successively bring the components into operating position at said stations. Further, in the embodiment illustrated, each of the supports includes a mandrel adapted to receive a relatively thin-walled electrode body that is to have a relatively thin preformed strap welded thereto. A movable jaw means is provided that positions and clamps the strap to said tubular body against the contoured front guide face of said mandrel. The welding operation is performed by a welder assembly having a slidable welding head for accurately engaging the predetermined weld area while the support strap or member is securely clamped to the tubular body against the guide face.

According to one subcombination feature of the present invention, this welding head is supported by a slide block that moves transversely to the axis of the support positioned at the welding station. The operating plunger of the slide block is substantially parallel to the slide block and an adjustable spring means is interposed between said plunger and said slide block to provide the effective welding pressure of the welding head. This welder construction gives a smooth operation that provides even and controllable welding pressure to the component being welded with the result of a more uniform and predictable welded joint.

According to other, but related specific aspects of the present invention, the loading and unloading operations are carried out in an advantageous manner without damage to the parts. This objective is accomplished by having the side faces of the supporting mandrel reduced and spaced from the body of the electron tube component being welded so that there will be less tendency for the critical beam-forming surface of the tubular body to be damaged by binding or scraping action against the supporting surface of the mandrel. Further, the unloader means of the preferred embodiment illustrated is designed to engage under the rim of the tubular body along these reduced side faces of the mandrel so that the component is lifted substantially straight up along its longitudinal axis to further lessen the chance of damage to the beam-forming surface. This unloading means takes the form of a fork-like member having arms that embrace the mandrel along the reduced side faces; said fork-like member being movable in a closed circuit path and being provided with a pneumatic nozzle for conveniently ejecting the component to a suitable receptacle at the apex of the path.

Thus, it is another object of the present invention to provide a machine of the type described for forming a high-quality welded joint or area between preformed parts for use in electron tube components.

It is also an object of the present invention to provide a machine for automatically welding electron tube components wherein specially formed work holders are utilized for presenting the separate parts in clamped relationship to the welding station and, more specifically, to provide such a machine having a mandrel with a front guide face against which a tubular electrode body and a support strap of a gun component can be securely clamped for the welding operation.

It is a related object of the present invention to provide a welding machine of the character described wherein the mandrel for the tubular electrode body has reduced side faces to aid in the loading and unloading operation of the machine.

It is still another object of the present invention to provide an automatic welding machine of the character described having a welding head that is movable transversely to the axis of the support positioned at the welding station in a smooth, even and unobstructed manner so as to produce a high quality welded joint between the parts.

A further object of the present invention is to provide a welding machine having an improved unloader means that embraces the supporting mandrel along the reduced side faces and through movement in a closed circuit path rapidly lifts the component totally free of the work holder and pneumatically ejects the same clear of the machine.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring now to the drawings:

FIG. 4 is a side view of the machine illustrated in FIG. 3;

FIG. 5a is a detailed side view of the work holder or fixture of the machine of the invention in the closed clamping position;

FIG. 5b is a view similar to FIG. 5a showing the work holder or fixture in an open position;

FIG. 6 is a plan view taken along line 6—6 of FIG. 5b;

FIG. 7 is a perspective view of a portion of the operating means for the work holder or fixture of FIGS. 5a and 5b;

FIG. 8 is a partial cross sectional view taken along line 8—8 of FIG. 3 showing the welder assembly of the invention;

FIG. 8a is a schematic diagram of the welding circuit of the welder assembly shown in FIG. 8;

FIG. 9 is a cross sectional view taken along line 9—9 of FIG. 8;

FIG. 10 is a side view of the unloader assembly of the present invention;

FIG. 11 is a cross-sectional view taken along line 11—11 of FIG. 10;

FIG. 12 is a cross-sectional view taken along line 12—12 of FIG. 10.

Figure 1:
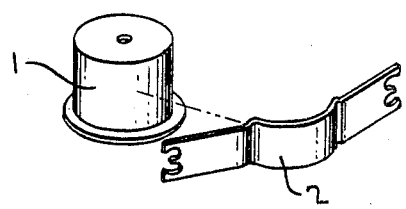
FIGURE 1 is an illustration of one type of electron tube component that consists of a tubular electrode body and a preformed strap which can be welded by use of the teachings of the present invention.
Figure 2:
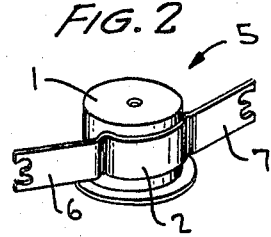
FIG. 2 is an illustration of the welded electrode component illustrated in FIG. 1.

With reference now to the drawings, it will be remembered that the present invention is broadly concerned with welding relatively thin metal parts together to form electron tube components for use in a variety of electronic tubes. However, for purposes of illustration and according to some more specific aspects of the present invention, there is shown in FIGS. 1 and 2 of the accompanying drawings only one specific type of electron tube component with which this invention is concerned. This component is a sub-assembly that consists of a tubular body 1 and a preformed strap or mounting member 2 that is to be used as an integral part of an electron gun component 5 for a color television tube, as explained in the aforementioned application.

The body 1 and the strap 2 are preferably fabricated from a suitable non-magnetic material, such as No. 305 stainless steel that includes 12% nickel and 18% chrome alloyed with ferrous metal. The walls of the tubular body 1 are of a thickness within a range of about 0.005 to 0.010 inch and the strap 2 is usually from 0.015 to 0.025 inch thick, which have been found to give the particular combination required for confining the electrons into a shaped beam and for strength and rigidity of the gun assembly. The body 1 is fabricated to close tolerances so as to have an inside beam-forming surface that is free of defects that might adversely affect the quality of the beam and the strap 2 is accurately stamped so as to possess tangentially extending legs 6, 7 that are adapted to be imbedded or mounted in thermoplastic material along with other similar components to form the electron gun assembly for a color television tube. It should be specifically understood that the showing of the particular cup-shaped tubular body 1 and the strap 2 having tangentially extending legs 6, 7 is merely for the purpose of illustrating the invention and that these parts may take alternative forms without departing from the invention; i.e. all of the individual components of a gun can be fabricated in accordance with this invention regardless of the particular shape of the parts 1, 2. For example, in an electron gun assembly the body 1 is tubular in form in each of the electrode subassemblies but may be open at both ends rather than cup-shaped. Similarly, the strap 2 is contoured to be adapted to be welded to the tubular body 1 but the legs 6, 7 need not particularly extend tangentially of the outside surface of the body 1.

Figure 3:
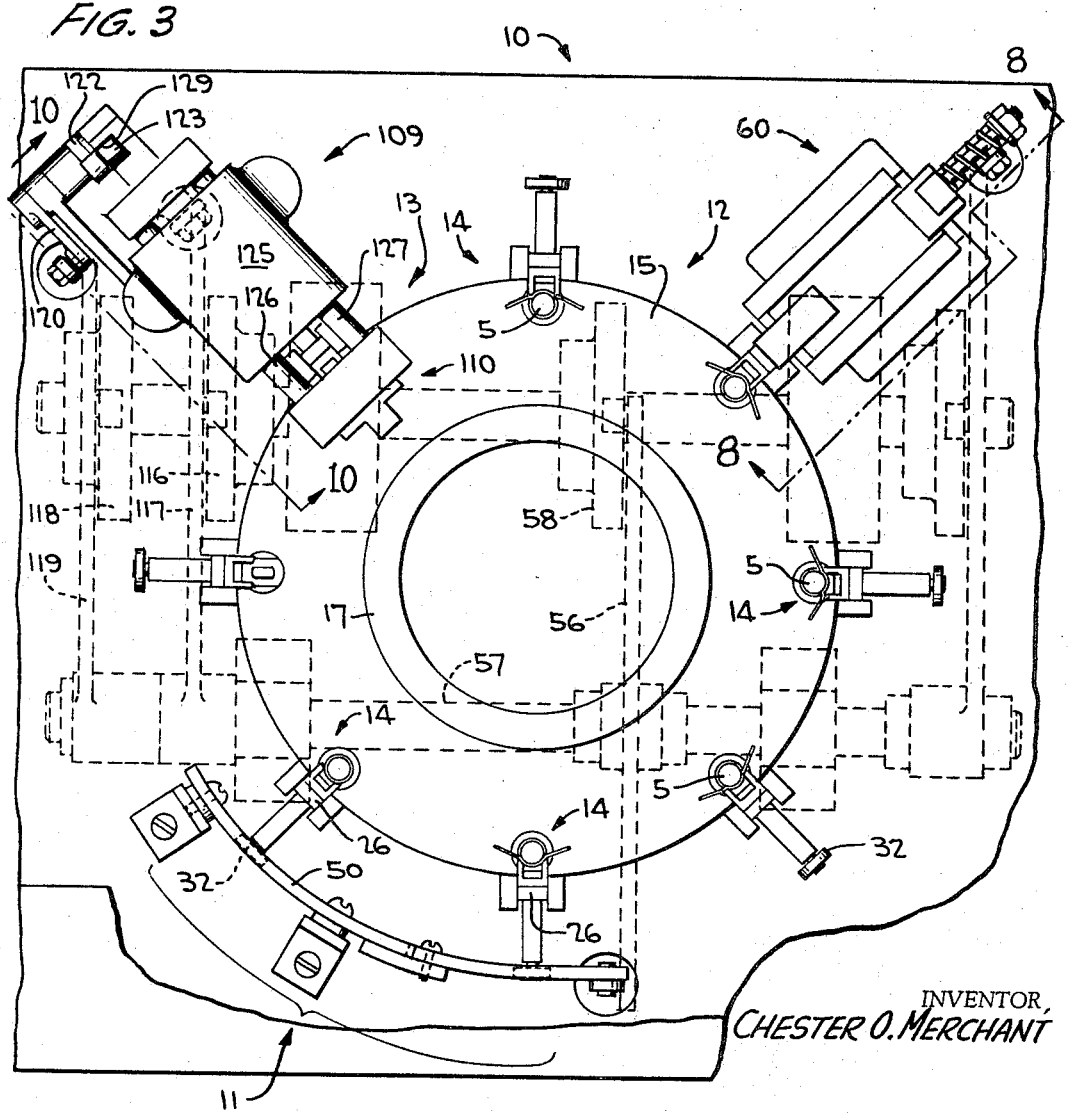
FIG. 3 is a plan view of a machine constructed in accordance with the teachings of the present invention, certain parts being omitted for clarity.

Proceeding now to the showing in FIG. 3, there is shown a welding machine 10 constructed in accordance with the teachings of the present invention, which machine 10 provides a loading station 11, a welding station 12 and an unloading station 13. These stations 11–13 are positioned so that it is possible to operate in succession on a plurality of electrode components 5, mounted on equally spaced work holders or fixtures 14 carried by an indexing turntable 15, which is carried and operated by any conventional indexing transmission unit, generally represented by the reference numeral 16, in FIG. 4. The indexing unit 16 is suitably carried by a table 17 (FIG. 4) so that the work holders 14 are presented at a convenient height for convenience in loading by an operator at the loading station 11, if desired.

The indexing unit 16 is driven by a suitable drive chain 19 that is operated from a rotating cam control shaft 20 suitably driven by an electric motor 21 and chain 21a. The indexing transmission unit 16 and the motor 21 are, or may be, of the adjustable type whereby the particular operation of the turntable 15 can be regulated as to dwell time and speed to suit the operation being performed on the machine 10. In any case the drive system just described is tailored to accurately present each of the work holders 14 to the operating stations 11, 12, 13 in accurate predetermined relationship in succession.

As viewed in FIG. 3, there are two idle positions of the turntable between the loading station 11 and the welding station 12 to permit the unloading of the tubular body 1 and the strap 2 should they be improperly placed and clamped on the work holder 14. This provides a safety factor in the arrangement in that the welding operation at the welding station 12 is not performed until after the parts have been inspected (either visually or mechanically) and judged to be in proper position to be welded together. An additional idle position is provided between the welding station 12 and the unloading station during which time the completed component 5 is maintained in the clamped position in the work holder 14 for complete setting or curing of the weld. The loading station 11 is illustrated as encompassing two positions of the indexing turntable 15 and it will be understood that the tubular body 1 is preferably loaded at the first position, and then moving counter-clockwise, the strap is loaded and clamped in the second position of said station 11.

Each of the composite work holders 14 mounted on the turntable 15 (as best illustrated in FIGS. 5a and 5b) includes an upstanding support, generally represented by the reference numeral 25, and a pivotal jaw 26 that is mounted for movement in opposed relationship to said upstanding support 25. The pivotal jaw 26 is carried by a pivot pin 27 mounted on a depending support 28 that is insulated from the turntable 15 by a suitable mounting pad 29.

As viewed in these figures, the movable jaw 26 is constantly urged in the clockwise direction about the pivot pin 27 by a spring 30 and there is provided an outwardly extending arm 31 that carries a cam follower 32 for engagement with suitable stationary cams positioned around the turntable 15 for operating said jaw 26 to the open position of FIG. 5b. The jaw 26 has a replaceable head 35 that terminates in a pair of spaced upstanding finger members 36 having tip portions 36a that are adapted to engage the strap 2 to position and securely clamp said strap 2 in the proper position against the body 2, in the manner now to be discussed.

As viewed in FIG. 6, the upstanding support 25 comprises a mandrel 40 that is flattened along the terminal portion thereof to have a pair of reduced side faces 41, 42 and is further formed with a front guide face 43 of curved configuration. The curvature of the front guide face 43 is such that it substantially corresponds to the inside of the tubular body 1 whereas rear face 44 of the mandrel 40 need not conform to the inside surface of the tubular body but should be of generally rounded configuration to aid in positioning the body 1 on the mandrel 40. With the front guide face 43 in substantial alignment with the inside surface of said body 1 in response to the effective clamping pressure on the strap 2 and with each of the operating assemblies at the fixed stations 11–13 properly adjusted with respect to the guide face 43 so as to have a predetermined spaced relationship therewith, it will be appreciated that there is provided a system wherein accurate and even welds can be obtained in a mass-production operation. It is pointed out that the front guide face 43 generally corresponds to the thusly accurately located weld area that is applied at the welding station 12 and that the upstanding finger members 36 are positioned to each side of said guide face 43 so that the tip portion 36a engage only the legs 6, 7 of the strap 2 during the clamping operation.

To support the strap 2 in juxtaposition to the tubular body 1 prior to the clamping operation by the jaw 26, there is provided an insulator collar 47 (see FIGS. 5, 5a) that is fitted on the lower portion of the mandrel 40 and which has spaced ledges 48, 49 properly positioned so as to support the strap 2 on its edge prior to the release of the jaw member 26 to resiliently clamp said strap 2 against the body 1. It should be noted in FIG. 5b that the jaw 26 is opened only to the extent to allow easy insertion of the strap 2 into the space between the cap 1 in its mounted position and the tip portions 36a of the upstanding members 36. This loose positioning of the preformed strap 2 is easily and rapidly accomplished at the loading station 11 since there is no need to provide exact angular registration of said strap at this time since this registration is automatically performed by the spaced members 36 engaging the legs 6, 7 as the jaw 26 is closed at the loading station 11. For example, if one of the legs 6, 7 is initially closer to its respective tip portion 36a, then the strap 2 is rotated around the outside of the body 1 until the other leg 6, 7 of the pair finally engages its corresponding tip portion 36a. Thereafter, the strap 2 is desirably brought into pressure contact with the body 1 against the guide face 43. After the component 5 has thus been clamped, it can be seen that there is little chance that the same can be dislocated due to outside jolts or bumps to the machine 10 whereby the welding operation at the station 12 can be properly carried out on accurately located parts.

It will be remembered that the loading station 11 encompasses two positions of the indexing turntable 15, as illustrated in FIG. 3; and as well illustrated in this figure, the loading station 11 is defined by the presence of a fixed cam 50 fixedly supported by posts 51 so that said cam 50 extends around the periphery of the turntable 15 to engage each of the cam followers 32 on the spaced work fixtures 14 as the turntable 15 is indexed. Accordingly, each of the work holders 14 will be opposite the cam 50 during two dwell-periods with the jaw 26 being held in the open or loading position so that the tubular body 1 and the strap 2 can be received at the respective positions of the loading station 11. A cam extension 52 is provided at the terminal portion of the fixed cam 50; which cam extension 52 is pivotally mounted by a suitable pin 53 secured to said cam 50. Adjacent the free end of the cam extension 52 is an operating pin 54 that is attached to an adjustable pitman 55. The pitman 55 receives timed vertical reciprocating motion from the oscillating lever 56 which is journalled on a pivot shaft 57, which motion originates in a suitably formed closed cam 58 that is fixed to the constantly rotating cam drive shaft 20. Thus, at the proper point in the cycle, the cam extension 52 is pivoted upwardly about the pivot pin 53 so as to release the jaw 26 for movement into pressure engagement with the strap 2; said jaw 26 operating in response to the spring 30 and serving to position the strap 2 in the final position for welding at the welding station 12. While the cam extension 52 remains in the raised dotted-line position (FIG. 7), the timing of the turntable 15 is such as to move the work holder 14 in the counter-clockwise direction to free the cam follower 32 of said cam extension 52 whereupon the cam extension 52 is once again returned to the full-line position that maintains the succeeding jaw 26 in the open position for receiving the strap 2.

It can be seen that by virtue of the fact that the turntable 15 is not released for movement from the loading station 11 until the cam 52 has been positioned in the dotted-line position to clamp the strap 2 and the body 1 securely against the forward guide face 43, there is no chance for the parts to become dislodged upon initiation of the movement of the turntable 15 for travel past the welding station 12. Further, it should be apparent that by securely clamping the preformed strap 2 by the finger members 36 that inherently position the contoured intermediate portion of the strap 2 on the cylindrical surface of the tubular body 1, the best possible mating relationship is obtained prior to the welding operation at station 12.

To accomplish the welding operation at the welding station 12, there is preferably provided an electrical resistance welder assembly 60 as best illustrated in FIGS. 4 and 8. It can be seen that said welder 60 is positioned above the table 17 by a single tower support 61 to which is attached a T-shaped mounting member 62 that is adapted for vertical sliding movement along an internal track. Manual adjustment of jack screw 65 which is fixed with respect to the support channel 61 by the outwardly extending ear 66 positions a welding head, generally designated by the reference numeral 67, with respect to the electrode component 5 that is carried by the upstanding support 25 (see FIG. 8).

As best seen in FIG. 9, the welding head 67 is carried by a horizontal slide block 68 that is positioned in a corresponding slide track along the sides of a cross member 69 of the T-shaped mounting member 62. The welding head 67 includes a replaceable welding electrode 70 that has a contoured face 70a that substantially fits the outer contour of the intermediate portion of the strap 2 (note FIG. 9).

The welding head 67 includes a bifurcated mounting plate 71 that supports the welding electrode 70 and serves to connect an electrical conductor 72 to said welding electrode 70 through suitable hold-down screws 73. The bifurcated mounting plate 71 and the hold-down screws 73 are insulated from the slide block 68 by insulation 74 so that the requisite welding current can proceed in a path between the conductor 72 and the electrode 70 for application to the electron gun component 5 that is held by the upstanding support 25 positioned at the welding station 12. The electrical circuit for the welding operation further includes a second conductor 75 which is connected via a brush assembly 76, a circular copper ring 77, and the turntable 15 to the mandrel 40, whereby when the electrode 70 is brought into engagement with the strap 2, the flow of high current electricity is introduced across the relatively high resistance but rigidly maintained interface between said strap 2 and the body 1 to heat the contacting faces of the parts for forming the requisite weld area. At this point the importance of having the body 1 securely clamped in mating condition against the contoured-to-fit guide face 43 of the mandrel 40 by the jaw 26 and of having a contoured-to-fit face 70a on the welding electrode 70 can be seen since it is important to have low resistance interfaces at these points to prevent undesirable heating and resultant pitting of the said faces 43, 70a by the electrical current. Both the mandrel 40 and the welding electrode 70 are fabricated from copper or other similar low electrical resistance metal, and the mandrel 40 is made to be easily replaceable if damaged just as is the case of the welding electrode 70. This replacement feature insures that the interfaces between the component 5, the mandrel 40 and the electrode 70 can be maintained at the desired low resistiviy with a minimum of expense and trouble.

The brush 76 is conveniently positioned in contact with a ring 77 by an overhanging and U-shaped beam 78 that is fixed to the bottom of the cross-member 69 of the T-shaped mounting member 62 (note FIG. 8). With this arrangement, it can be seen that the electrical current flow between the copper ring 77 and the mandrel 40 across the gap in the turntable 15 is always of minimal length for greater welding efficiency. At the same time, the copper ring 77 is thus positioned in a manner such as to be totally free of any obstruction from other working parts of the machine 10 and readily accessible for service, if necessary.

For the purpose of further insuring a uniform weld to the component 5 during each cycle, a welding current timer 80, as schematically illustrated in FIG. 8a, is provided to initiate a controllable, high voltage current flow through the primary winding of a transformer 84 which in turn drives the secondary winding for delivering the low voltage, high current flow through the conductors 72, 75 to the mandrel 40 and the welding electrode 70 at the proper time. The timer 80 is actuated by a microswitch 81 on the T-shaped mounting member 62 and receives the required electrical potential from a pair of supply lines 82, 83. The microswitch 81 is operated in conjunction with the forward movement of the welding head 67 to the welding position, as will be seen later.

Attached to the conductor 75 is a reed switch 85 having a stationary contact 86 and a pivotal contact 87 for initiating a counter 88 that is operated through a relay 89 from the supply lines 82, 83. It will be appreciated that each time the welding operation is performed on the electrode component 5, the surge of current through the conductor 75 will create a magnetic field to attract the pivotal contact 87 to the contact 86 and thereby complete the counter circuit to step the count through one increment.

If it should happen that either or both the body 1 and the strap 2 of the electrode component 5 are not present on the mandrel 40 when the welding electrode 70 is advanced for the welding operation, then said welding electrode 70 will stop short of said mandrel 40 so that there will be no current flow through the welder circuit during this particular cycle. With this arrangement, the counter 88 is advanced only when a successful weld is completed so that the count is accurate even if each upstanding support 25 does not contain parts to be welded, i.e., if a part is for some reason not properly positioned at the loading station 11 and is removed before reaching the welding station 12, there will be no welding operation and no false advancement of the counter 88.

The horizontal movement of the welding head 67 during each cycle of the machine is provided by a cam-operated mechanism that provides the requisite action with smoothness and axially directed force that has heretofore not been obtainable. To explain, reference is made to FIGS. 4 and 8 wherein it can be seen that the slide block 68 carries a depending arm member 90 which supports a lateral pivot block 91 which has an aperture (not shown) formed centrally between the depending bifurcated portions of the arm member 90 (note FIG. 4). This aperture receives a plunger rod 92 (FIG. 8) that is surrounded by a spring 93, one end of which acts against the rearward face of the pivot block 90 and the other end of which is adjustably held by the bolt 94. The forward end of the plunger 92 is pivotally connected to the free end of the vertical leg of bell crank 95 that operates about a pivot shaft 96 fixed to the T-shaped mounting member 62. The horizontal leg of the bell crank 95 is connected at its free end to an adjustable driving pitman 97 that is reciprocated vertically by a closed cam 98 and lever 99 combination, as illustrated in FIG. 4. The cam 98 is driven by the shaft 20 in timed relationship with the other functional parts of the welding machine 10 so that the welding head 67 is advanced and retracted at the proper time when each of the electrode components 5 is stopped in position at the welding station 12.

It will be recalled that the actual initiation of the welding operation is accomplished by a microswitch 81 and as can be seen in FIG. 8, an adjustable bolt 100 carried by the bell crank 95 is used to operate said microswitch 81 during each cycle of the machine 10. Thus, as the bell crank 95 is rotated in the counter-clockwise direction and the welding head 67 is moved into welding position, the microswitch 81 is closed at the proper time after the welding electrode 70 is seated against the strap 2 to initiate the welding operation that is thusly carried out in a controlled manner.

After each of the electrode components are welded at the welding station 12, it will be realized that the jaw 26 of the workholder 14 is maintained in clamping relationship to the electrode component 5 and this clamping pressure desirably is not released until the unloading station 13 is reached which results in the weld area of each of the components 5 having a sufficient time to set or cure before the clamping pressure of the jaw 26 is relieved. Normally it has been found that one idle station, as shown in FIG. 3 of the drawings, is sufficient to give the welded joint time to set before releasing the pressure of the jaw 26; however, it should be understood that the particular time for releasing the clamping pressure of the jaw 26 depends on the particular weld area being formed and the particular component 5 being welded.

For the purpose of releasing this clamping pressure for the unloading operation, there is provided a stationary cam plate 105 that is held in the proper position above the table 17 by a tower support 106, as shown in FIG. 10 of the drawings. As can be realized, the path of the cam follower 32 meets an operative face 107 of the cam plate 105 during each cycle of the machine 10 that pivots the particular jaw 26 in the counter-clockwise direction against the force of the spring 30 so that each of the components 5 is released at the designated unloading station 13. More particularly, attention is directed to FIG. 11 that shows the cam follower 32 in the full-line position as it approaches the operative face 107 of the cam plate 105 and thence as it is subsequently moved to the dotted-line position along the path of the arrows where the component 5 is completely released and ready to be engaged by a double motion unloader assembly 109 having an unloader fork 110 (FIG. 10) that lifts and ejects each of the components 5 in turn, in a manner now to be discussed.

To provide the support for the unloader assembly 109, there are provided in the cross beam of the tower support 106 a pair of spaced operating rods 112, 113 (FIG. 11) that are adapted for up and down reciprocating movement, as indicated by the arrow in FIG. 10 and which constitutes the first direction of movement to said unloader assembly 109. The operating rods 112, 113 are carried by a connecting collar or yoke 114 which is, in turn, supported by a single pitman 115 that is operated in a positive manner by a suitable closed cam 116 and lever 117 combination that is shown in dotted lines in FIG. 3.

The second motion of the double motion unloader 110 is gained by a similar and relatively timed cam 118 and lever 119 combination (FIG. 3) which gives an additional pitman 120 a corrsepondingly timed and reciprocating motion operating in conjunction with the sliding operating rods 112, 113. The reciprocating action of the pitman 120 is translated into horizontal reciprocating motion by a bell crank type linkage comprising an horizontal lever 121 that receives the driving force from the vertically reciprocating pitman 120 and transfers the same through a pivot shaft 122 that is suitably journaled by the support 106 to a vertical lever 123. The vertical lever 122 carries a small roller 124 at the upper end thereof which is thus capable of horizontal reciprocating motion, as indicated by the arrow adjacent thereto in FIG. 10.

With reference to FIGS. 3 and 10, the unloader assembly 109 is seen to comprise a main supporting head 125 that is carried by the upstanding rods 112, 113. The supporting head 125 is bored perpendicular to said rods 112, 113 for reception of a pair of sliding plungers 126, 127 (FIG. 3) and connected to the rear end of said plungers 126, 127 is a cap 128 with a vertically extending track 129 formed in the rearmost portion thereof for reception of the horizontally moving roller 124. Accordingly, it will be realized that the plunger rods 126, 127 are bodily movable in a horizontal direction as controlled by the cap 128 and, at the same time, said plunger rods 126, 127 are given a vertically reciprocating motion by the movement of the supporting rods 112, 113. Disposed on the forward end of the plungers 126, 127 is a mounting cap 130 to which the unloader fork 110 is affixed.

In order to summarize the closed circuit movement of the unloader fork 110, reference is made to FIG. 10 wherein the fork 110 is shown in the full-line home position behind the support 25 and below the plane of the bottom rim of the welded electrode component 5. To start the unloading operation, the forward movement is initiated by the counter-clockwise rotation of the lever 123 which moves the plungers 126, 127 through the mounting head 125 until the full forward position of the unloader fork 110 is reached, which position is identified by the reference numeral 110a. The mounting head 125 is then raised upwardly by the supporting rods 112, 113 to lift the fork 110 to the apex of the path identified by reference numeral 110b and thence the fork 110 is returned to the full-line home position in readiness for the next cycle.

It will be remembered that, according to the invention, the mandrel 40 has reduced side faces 41, 42 and the unloading fork 110 is provided with forwardly extending arms 131, 132 that are spaced apart a distance equal to the width of the mandrel 40 in this area of the side faces 41, 42 so that said mandrel 40 is embraced by the arms 131, 132 in the forward position 110a. Thus, the arms 131, 132 engage the bottom rim of the tubular body 1 at four spaced points about said body so that when the unloader fork 110 is moved vertically upward to the position 110b, the welded electrode 5 is carried along until the said electrode 5 is totally free of the support 25. At this point, the apex of the closed circuit path 110b is reached and the welded electrode 5 is ready for ejection from the machine 10 by a timed blast of air from a passage 133. A nozzle 134 of the passage is directed in the direction of the forwardly extending arms 131, 132 so that when the position 110b is reached, the welded electrode 5 that rests on the arms 131, 132 is blown into a suitable chute 135 positioned to accept the welded electrode 5 and to transport it to a suitable container (not shown). It will be understood that the air blast from the nozzle 134 is properly timed by a suitable means, such as a cam (not shown) so that the component 5 is not ejected until the unloader fork 110 has reached the position 110b.

It will be apparent to those skilled in this art that the integrated operation of the welding machine 10 and the process of welding disclosed herein offers substantial advantages over previous arrangements in that the parts to be welded are securely clamped in position at a loading station 11, indexed past idle stations during which inspection of the parts can be made, welded at the welding station 12 and then unloaded after the weld has been completed and allowed to set for a sufficient time before the clamping pressure is released. Further, the motion of the welding assembly 60 is such as to be smooth and accurate so as to provide a predictable and strong weld area between the tubular body 1 and said strap 2; the welder assembly motion being gained from a cam-operated linkage system (FIG. 8) with adjustable interposed spring means which assures positive motion and predictable pressure along the axis of movement of the welding head 67. At the unloading station 13, the single unloader fork 110 moves through a closed circuit path to rapidly lift and eject each of the completed components 5 from their respective supports 25; each component 5 being lifted totally clear of the supports 25 on the turntable 15 by the vertical lifting action on the bottom rim of the body 1 and then ejected in the direction of the open end of the fork 110.

It will be appreciated that such a system is continuous and that high production of the parts can be gained without a sacrifice in the quality of the product, which is very important in the manufacture of tube components that operate on electron beams. Also, it is clear that, since the welder and unloader assemblies 60, 109, respectively, are fixed with relation to the turntable 15 in precise register only with the front guide face 43 of each of the individual mandrels 40, the welding operation can be accurately performed while the component 5 is clamped against said guide face 43 for registry and then that the unloading operation can be performed while the component 5 is loosely positioned with respect to the guide face 43 to thereby eliminate the chance of damaging the critical electron beam-forming surfaces of said component 5.

While the machine 10 has been disclosed in conjunction with no specific automatic loading structure at station 11, it should be understood that automatic loading of the parts is particularly suited to this system due to the fact that the body 1 and the strap 2 initially need only be loosely positioned for proper functioning of the remainder of the apparatus, and accordingly such automatic loading features are presently contemplated by me for use with the apparatus of this invention. Further, it is realized that while an electric resistance welder assembly 60 is preferred, any other type of welder, including the recently developed ultrasonic and laser beam welders could be used in conjunction with certain aspects of the present invention.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. A machine for automatically welding together two electron gun components, which comprise a tubular body and a preformed strap to be welded to said body, comprising an indexing turntable, a plurality of fixed operating stations situated around said turntable including a loading station, a welding station and an unloading station, a plurality of upstanding supports mounted on said turntable for supporting said components, stepping means for intermittently rotating said turntable so as to successively bring said supports into operating position at said stations, each of said supports including a mandrel adapted to receive said body, each mandrel having reduced side faces to facilitate loading and unloading of said body and a front guide face conforming to the inside surface of said body, said guide face having a predetermined relationship to said fixed stations, jaw means movable with said turntable associated with each of said supports in opposed relationship thereto for positioning and securely clamping said strap to said body against said guide face at one of said operating stations, a welder including a welding head that is movable transversely to the axis of the mandrel positioned at said welding station to perform the welding operation at a further one of said operating stations, said welding head operatively engaging said strap in opposed pressure relationship to said guide face of said mandrel to form a predetermined weld area while said body and said strap are securely clamped against said guide face by said jaw means, and means at said unloading station for engaging under said body along the reduced side faces of the mandrel positioned at said unloading station to lift the welded component from said mandrel.

2. The combination of claim 1 wherein each of said jaw means includes a pair of upstanding members adapted to engage said strap outside said predetermined weld area, and a pivot shaft for said jaw means extending perpendicular to the axis of the respective mandrel and positioned below the plane of said turntable whereby said body and said strap can be loaded and unloaded from above.

3. The combination of claim 2 wherein is further provided spring means for urging said jaw means toward the associated support, a first cam track on said machine adjacent said unloading station for operating each of said jaw means about its pivot shaft to release the welded component for unloading, a second cam track adjacent said loading station to operate said jaw means to permit loading of said body and said strap on the associated support, and means for disengaging said second cam track from operative engagement with said jaw means while said support remains stationary in the operating position at said loading station.

4. The combination of claim 3 wherein said second cam track includes a separate pivotally mounted section of track at said loading station and said cam track disengaging means includes operating means for pivoting said track section about its pivot axis away from engagement with said jaw means.

5. The combination of claim 3 wherein each of said supports includes an insulator collar surrounding said mandrel, said collar including an upper guide portion for locating said strap in juxtaposition to said body prior to clamping the same against said mandrel, said guide portion being spaced from said reduced sides of said mandrel to permit engagement of said unloading means with the bottom of said body.

6. The combination of claim 1 wherein the operative face of said welding head is formed to substantially fit the contour of said strap at said weld area and wherein said welder further includes a stationary support having longitudinally extending guide tracks, a slide block disposed in said tracks for carrying said welding head, an operating plunger extending substantially parallel to said slide block, a spring interposed between said plunger and said slide block, said spring being operative in the forward direction of movement of said welding head toward said mandrel to provide the effective welding pressure, means for adjusting the compression in said spring to regulate said effective welding pressure, and positive driving means for said operating plunger.

7. The combination of claim 1 wherein said unloading means comprises a fork movable in a closed circuit path toward and away from the mandrel positioned at said unloading station, said fork having spaced arms adapted to embrace said reduced side faces of said mandrel to lift said welded component totally free of said mandrel and pneumatic means mounted on said fork to eject said welded component from said fork when said fork is positioned adjacent the apex of said path.

8. The process of welding an electron gun component, which includes a tubular body and a performed strap to be welded to said body comprising the steps of fitting said body over the end of an upstanding support, loosely positioning said strap in juxtaposition of said body at a loading position, clamping said strap securely to said body against the opposed face of said support, moving said support to a welding position in opposed relationship to a welding head, driving said welding head into operative engagement with said strap, applying welding energy to said welding head to form a predetermined weld area while said body and said strap are securely clamped against said face of said support, withdrawing said welding head from operative engagement with said strap, moving said support away from said welding position, and releasing the welded component from clamped engagement with said face of said support.

9. The process of claim 8 including the additional steps of moving said support to an unloading position, lifting said welded component in an axial direction totally free of said support and blowing said component away from said support.

10. A machine for automatically welding together two electron tube components, which include an electrode body and a member to be welded to said body, comprising a turntable, a plurality of fixed operating stations situated around said turntable including a loading station, a welding station and an unloading station, a plurality of upstanding supports mounted on said turntable for supporting said components, means for rotating said turntable so as to successively bring said supports into operating position at said stations, jaw means movable with said turntable associated with each of said supports in opposed relationship thereto for positioning and securely clamping said member to said body against said support at one of said operating stations, a welder including a welding head that is movable transversely to the axis of the support positioned at said welding station to perform the welding operation at a further one of said stations, means for moving said welding head operatively into engagement with said member in opposed pressure relationship to said support, means for energizing said welding head to form a predetermined weld area while said body and said mounting member are securely clamped against said support by said jaw means.

11. The combination of claim 10 wherein is further provided a cam track adjacent said loading station to operate said jaw means to permit loading of said body and said strap on the associated support, and means for disengaging said cam track from operative engagement with said jaw means while said support remains stationary in the operating position at said loading station.

12. In an automatic welding machine for welding one electron tube component to another, which component includes an electrode body and a member to be welded to said body, the improvement of a welder assembly comprising a support for said component, a welding head that is movable transversely to the axis of the support, said welding head operatively engaging said member in opposed pressure relationship to said support means for energizing said welding head to form a predetermined weld area, means for slidably supporting said welding head for said transverse movement and away from said component, an operating plunger extending substantially parallel to said supporting means, a spring interposed between said plunger and said supporting means, said spring being operative in the forward direction of movement of said welding head toward said support to provide the effective welding pressure, means for adjusting the compression in said spring to regulate said effective welding pressure, and positive driving means for said operating plunger, wherein is further provided a counter circuit for recording the number of welding operations, said counter circuit including a reed switch mounted in juxtaposition to said welder circuit, said reed switch being operative to actuate said counter circuit in response to the flow of current in said welder circuit.

References Cited
UNITED STATES PATENTS

| | | | |
|---|---|---|---|
| 1,269,617 | 6/1918 | Ledwinka | 219—87 |
| 1,826,207 | 10/1931 | Fassler | 219—80 |
| 2,927,991 | 3/1960 | Schoelz | 219—87 |
| 3,316,382 | 4/1967 | Shumaker et al. | 219—80 X |
| 3,317,702 | 5/1967 | Mann | 219—79 |
| 3,321,606 | 5/1967 | Cropp et al. | 219—79 |

RICHARD M. WOOD, *Primary Examiner.*

BARRY A. STEIN, *Assistant Examiner.*

U.S. Cl. X.R.

219—158, 79